United States Patent [19]

Reiners et al.

[11] Patent Number: 5,521,004
[45] Date of Patent: *May 28, 1996

[54] REFLECTION-REDUCED, BONDABLE STRETCHED FILM AS WINDOW FILM FOR ENVELOPES

[75] Inventors: Ulrich Reiners, Neuenkirchen; Anton Krallmann; Neele Neelen, both of Fallingbostel; Helmut Kuhlenkamp, Soltau, all of Germany

[73] Assignee: Wolff Walsrode Aktiengesellschaft, Walsrode, Germany

[ * ] Notice: The term of this patent shall not extend beyond the expiration date of Pat. No. 5,468,563.

[21] Appl. No.: 225,199

[22] Filed: Apr. 8, 1994

[30] Foreign Application Priority Data

Apr. 16, 1993 [DE] Germany .......................... 43 12 389.9

[51] Int. Cl.⁶ ...................................... B32B 5/16
[52] U.S. Cl. .......................... 428/332; 428/515; 428/516; 428/910; 428/913.3; 427/533
[58] Field of Search .................................. 428/500, 515; 427/533

[56] References Cited

U.S. PATENT DOCUMENTS

| 4,442,158 | 4/1984 | Distler . |
| 4,522,887 | 6/1985 | Koebisu et al. .................... 428/461 |
| 4,816,340 | 3/1989 | Doi et al. . |

FOREIGN PATENT DOCUMENTS

| 0184294 | 6/1986 | European Pat. Off. . |
| 0564846 | 10/1993 | European Pat. Off. . |
| 4109368 | 9/1992 | Germany . |
| 1168539 | 5/1967 | United Kingdom . |
| 2166113 | 4/1986 | United Kingdom . |

*Primary Examiner*—Edith Buffalow
*Attorney, Agent, or Firm*—William C. Gerstenzang; Sprung Horn Kramer & Woods

[57] ABSTRACT

The present invention relates to a stretched, multilayer, transparent film which is reflection-reduced on at least one side, consists predominantly of polypropylene and is very suitable as window film for envelopes.

7 Claims, No Drawings

REFLECTION-REDUCED, BONDABLE STRETCHED FILM AS WINDOW FILM FOR ENVELOPES

The present invention relates to a stretched, multilayer, transparent film which is reflection-reduced on at least one side and is bondable on fast running envelope-making machines.

Until now, it is principally polystyrene film or also PVC film which have been used as window film for envelopes. For environmental reasons, other materials such as for example polypropylene should be used in this application. Biaxially oriented polypropylene films (BOPP films), as are for example known from EP 0 102 209, are occasionally also used. BOPP films known from the literature are not usually readily bondable on fast running envelope-making machines.

Unless these films are bondable due to an applied lacquer layer (EP 0 102 209), they have the disadvantage that they are highly glossy and reflective, making the address fields poorly readable by automatic readers. Matt films, as for example described in EP 0 122 495 or JP 098271/81, have the disadvantage that they exhibit poor transparency.

The object was thus to provide a transparent stretched polypropylene film which has a reflection-reduced surface and is transparent and bondable.

This was achieved according to the invention with a polypropylene film consisting of at least two layers, which are characterised in that the outer layer is reflection-reduced, has corona, flame or fluorine pretreatment and low haze.

The reflection-reduced layer consists of:
5–60 wt. % of a low density linear ethylene modified with rubber and maleic anhydride,
5–15 wt. % of a co- and terpolymer prepared from propylene/ethylene/butylene, with propylene as the principal component and
25–90 wt. % of one or more polypropylene/polyethylene block copolymers.

The core layer of this film predominantly consists of polypropylene. An additional outer layer of polypropylene and customary commercial antiblocking agents such as silicon dioxide, sodium aluminium silicate may also be added. The film according to the invention may contain known slip agents, such as erucic acid amide, oleic acid amide or polydimethylsiloxane and antistatic agents such as, for example, ethoxylated fatty acid amides.

Starting materials for the reflection-reduced layer are:
1. Polypropylene copolymers prepared from propylene and α-olefins, preferably ethylene, preferably produced using a block copolymerisation process, or heterophase copolymers of ethylene and propylene or rubber-modified polypropylene.
2. Linear low density ethylene copolymers modified with rubber and maleic anhydride.
3. Random propylene/ethylene copolymers with 2 to 6 wt. % of ethylene or random terpolymers of propylene, ethylene and butylene with a comonomer content of <15 wt. % and a butylene content of <7 wt. %, Starting materials for the core layer are:
An isotactic polypropylene with an n-heptane soluble portion of 15% of less, with a density of 0.9–0.91 g/cm$^3$ and a melt index of 0.5 g/10 min to 8 g/10 min at 230° C. and 21.2 N load (determined to DIN 53 735), a polypropylene with a melt flow index of 1 to 5 g/10 min is particularly preferred
and/or
a random propylene/ethylene copolymer with 2 to 6 wt. % of ethylene, with a density of preferably 0.895 to 0.96 g/cm$^3$, a melt index of 1 to 7 g/10 min at 230° C. and 21.2 N load and a crystallite melting point, depending on the grade, in the range 125° to 148° C. (under a polarising microscope).

Starting materials for the second outer layer are:
Isotactic polypropylene and/or random copolymers as also used as starting materials for the core layer, but in the outer layer with added antiblocking agents (for example inorganic antiblocking agent silicon dioxide Syloblock 44® from Grace).

The film according to the invention is produced using per se known processes, for example by coextrusion. On leaving the slot die, this coextruded film is cooled in such a manner that the reflection-reduced layer is cooled as slowly as possible. The film is then reheated to 120° to 130° C. and is longitudinally stretched by a ratio of 3:1 to 7:1, preferably from 4:1 to 5:1. After longitudinal stretching, the film undergoes; transverse stretching at temperatures of between 150° and 180° C. in a stretching tunnel by a ratio of 7:1 to 12:1, preferably from 8:1 to 9:1. Before leaving the stretching tunnel, the film is heat set at temperatures of 150° C. to 160° C. Before winding, the film is subjected to corona or flame pretreatment on at least the reflection-reduced side of the film. The film may optionally also receive fluorine pretreatment in a separate operation.

An alternative method to the process described above for the production of 3 layer film is a 2 layer coextrusion of the core layer and second outer layer which, as described above, are first stretched together longitudinally. Between leaving the longitudinal stretching section and entering the transverse stretching section, the reflection-reduced layer is, as described in EP 0 424 761 A2, applied by lamination or extrusion. After application of this layer, the film structure undergoes transverse stretching by a ratio of 7:1 to 12:1, preferably by a ratio of 8:1 to 9:1, which, as is customary, is followed by heat setting and corona or flame pretreatment or fluorine pretreatment.

The reflection-reduced layer is characterised in that it is preferably of a thickness of 1–3 μm and consists of
5–60 wt. % of an ethylene-based copolymer modified with polar groups,
5–15 wt. % of a random copolymer prepared from propylene and ethylene with an ethylene content of 2 to 6 wt. %,
25–90 wt. % of polypropylene copolymers produced using a block copolymerisation process.

The core layer is preferably of a thickness of 15 to 50 μm and consists of
95 to 100 wt. % of an isotactic polypropylene with a melt index of 0.5 to 8 g/10 min (230° C./21.2 N),
5 to 0 wt. % of an antistatic agent and/or slip agent.

The second outer layer is preferably of a thickness of 0.5 to 1.5 μm and consists of
97 to 100 wt. % of an isotactic polypropylene with a melt index of 0.5 to 8 g/10 min (230° C./21.2 N) and
3 to 0% of a slip agent, antiblocking agent and antistatic agent.

The adhesion of polyolefin films to customary commercial adhesives, printing inks etc. may be improved by corona, flame or fluorine treatment.

Corona pretreatment is, for example, described by Martens in *Corona-Behandlung für Benetzung und Haltung auf Bedruckstoffen* [corona treatment for wetting and adhesion on printing substrates], in Coating 6/92 on pages 187–190.

Flame pretreatment is described in DE-OS 28 12 605. Dr. R. Milker et al describe fluorine treatment in the publication *Fluor macht Kunststoffe gefügig* [fluorine tames plastics]in the periodical *Adhäsion* May 1989. This improvement in adhesion is sufficient only for certainly readily bonded applications, for example the lamination of printed products. It has surprisingly been found that a simple corona, flame or fluorine pretreatment imparts good bondability to the film according to the invention. It was particularly surprising in this connection that bondability of the film according to the invention is sufficient in fast running envelope-making machines and that the film is distinctly reflection-reduced and simultaneously highly transparent.

In the following examples, the following test methods and processes for determining values and properties are used.

Gloss is determined to DIN 67 530. The proportion of light reflected at an angle of 60° is measured here in gloss units GE.

Haze is determined to ASTM D 1003. Haze is stated in (%) and is the ratio of diffuse light transmission to total light transmission multiplied by 100.

Bondability is tested for this film in the following manner:

An adhesive (dispersion adhesive from Henkel, Adhesin® A 7250) is applied to the surface of the reflection-reduced layer with an appropriate applicator. This applicator has a bore with a diameter of 4 mm through which the adhesive passes to reach the film. Application thickness is controlled by means of a slot of width 0.1 mm.

After a short waiting period, writing paper (bigraph®70 g/m$^2$, order n° 91.3203) is placed on top of the bead of adhesive. Bonding is achieved by pressing with two sheets of glass at a pressure of 10 g/cm$^2$ for 30 seconds. The bonded structures should then be stored for 24 hours at room temperature without pressure and then separated. Bondability is then assessed according to the appearance of the separated surfaces. The paper and film structure is separated such that the film is pulled off at an angle of 90°.

If a good bond is achieved, paper fragments are removed during separation so that the film remains covered with paper in the area where the adhesive was applied. In this case, the adhesive strength between film and paper is greater than the inherent strength of the paper. With poor bonding, the separated surfaces have the following appearance: the film may be completely removed from the adhesive, which remains stuck on the paper.

EXAMPLE 1

A three-layer film, reflection-reduced on one side and with a total thickness of 30 μm was produced by coextrusion and subsequent orientation and heat setting. One of the outer layers (reflection-reduced layers) has a thickness of 2 μm, the other outer layer a thickness of 1 μm and the core layer a thickness of 27 μm.

The core layer consists of polypropylene with added antistatic agent and slip agent. The melt index for the polypropylene used was 3.0 g/10 min (230° .C, 21.2 N).

The transparent outer layer consisted of the same polypropylene also containing silicon dioxide as antiblocking agent, in addition to the antistatic agent and slip agent.

The reflection-reduced layer consisted of the following materials:

- 80 wt. % of propylene/ethylene block copolymer with a melt flow index of 3.0 g/10 min and a notched impact strength of 50 kJ/m$^2$ at a temperature of 0° C. (DIN 53 448/1B).
- 10 wt. % of a maleic anhydride modified linear polyethylene with a melt flow index of 1.7 g/10 min and a Vicat softening point of 76° C.
- 10 wt. % of a random propylene/ethylene copolymer with a melt flow index of 4.7 g/10 min and a melting point of 135° C.

The film was produced with a longitudinal stretch ratio of 5.0 and a transverse stretch ratio of 9.8. Heat setting was performed at a temperature of 160° C. The reflection-reduced layer was corona pretreated.

EXAMPLE 2

The thicknesses and formulation for the core layer and transparent outer layer are as in example 1. The reflection-reduced layer is also 2 μm thick and is of the following composition:

- 30 wt. % of a propylene/ethylene block copolymer with a melt flow index of 3.0 g/10 min and a notched impact strength of 50 kJ/m$^2$ at a temperature of 0° C. (DIN 53 448/1B).
- 60 wt. % of a maleic anhydride modified linear polyethylene with a melt flow index of 1.7 g/10 min and a Vicat softening point of 76° C.
- 10 wt. % of a random propylene/ethylene copolymer with a melt flow index of 4.7 g/10 min and a melting point of 135° C.

The film was produced using the same process parameters as in example 1.

COMPARATIVE EXAMPLE 1

Walothen® C30 SE (manufacturer: Wolff Walsrode AG), a biaxially oriented heat-sealable film, corona pretreated on one side, was used as comparative example 1. This is a polypropylene film with a total thickness of 30 μm.

COMPARATIVE EXAMPLE 2

A matt film with the trade name Alfan® SO 202 distributed by the Japanese company Honshu with a thickness of 20 μm. The film is used as a laminating film for finishing printed products.

COMPARATIVE EXAMPLE 3

BOPP film, acrylic lacquer coated on both sides, from Mobiloil Corp., sold as Bicor® MB 600 with a thickness of 25 μm.

COMPARATIVE EXAMPLE 4

A three-layer BOPP film of the following structure: transparent outer layer, core layer and reflection-reduced outer layer. The core layer and second outer layer are as in example 1. The reflection-reduced layer is also 2 μm thick and is of the following formulation:

- 80 wt. % of a propylene/ethylene block copolymer with a melt flow index of 3.0 g/10 min and a notched impact strength of 50 kJ/m$^2$ at a temperature of 0° C. (DIN 53 448/1B).
- 20 wt. % of a random propylene/ethylene copolymer with a melt flow index of 6 g/10 min and a crystallisation temperature of 135° C.

Processing parameters are as in example 1.

The following table shows the results of the examples and comparative examples.

TABLE

| Example | Gloss 60° | Haze % | Bondability | Machinability |
|---|---|---|---|---|
| 1 | 35 | 20 | + | ++ |
| 2 | 33 | 22 | + | + |
| Comparative example 1 | 80 | 2 | − | − |
| Comparative example 2 | 8 | 80 | 0 | + |
| Comparative example 3 | 100 | 1.50 | + | + |
| Comparative example 4 | 50 | 25 | 0 | 0 |

Meaning of assessment criteria:
++ very good
+ good
0 moderate
− inadequate

Only examples 1 and 2 may be readily bonded and fulfil the desired requirements in terms of optical properties.

We claim:

1. An envelope window comprising a transparent reflection-reduced, bondable biaxially stretched film, longitudinally stretched by a ratio of 3:1 to 7:1 and transverse stretched by a ratio 7:1 to 12:1, having at least two layers, at least one of which is a reflection-reduced layer and at least one of which is a core layer, said reflection-reduced layer having a thickness of from 1 μm to 4 μm and being corona, flame or fluorine pretreated and having a surface gloss of less than 60 gloss units and a haze of less than 40% and wherein said reflection-reduced layer consists essentially of 5–60 wt. % of an ethylene-based copolymer modified with polar groups, 5–15% of a random copolymer prepared from polypropylene and ethylene with an ethylene content of 2 to 6 wt. %, 25–90 wt. % of polypropylene copolymers produced using a block copolymerization processing; and said core layer consists essentially of 95–100 wt. % of an isotactic polypropylene with a melt index of 0.5 to 8 g/10 min (230° C. 21.2 N), and 5 to 0 wt. % of an antistatic agent, a slip agent or both.

2. Window according to claim 1, having a thickness of at least 10 μm.

3. Window according to claim 1, having a second outer layer containing an antiblocking agent.

4. Window according to claim 1, containing a slip agent, antistatic agent and antiblocking agent.

5. Window according to claim 1, having more than three layers.

6. An envelope having a window closed by a film according claim 1.

7. An envelope window comprising a transparent reflection-reduced, bondable stretched film, transversely stretched by a ratio 7:1 to 12:1, having at least two layers, at least one of which is a reflection-reduced layer and at least one of which is a core layer, wherein the layers other than the reflection-reduced layer are also longitudinally Stretched, by a ratio of 3:1 to 7:1 and wherein said reflection-reduced layer is optionally also so longitudinally stretched, said reflection-reduced layer having a thickness of from 1 μm to 4 μm and being corona, flame or fluorine pretreated and having a surface gloss of less than 60 gloss units and a haze of less than 40% and wherein said reflection-reduced layer consists essentially of 5–60 wt. % of an ethylene-based copolymer modified with polar groups, 5–15% of a random copolymer prepared from polypropylene and ethylene with an ethylene content of 2 to 6 wt. %, 25–90 wt. % of polypropylene copolymers produced using a block copolymerization process; and said core layer consists essentially of 95–100 wt. % of an isotactic polypropylene with a melt index of 0.5 to 8 g/10 min (230° C./21.2 N), and 5 to 0 wt. % of an antistatic agent, a slip agent or both.

* * * * *

UNITED STATES PATENT AND TRADEMARK OFFICE
CERTIFICATE OF CORRECTION

PATENT NO. : 5,521,004
DATED : May 28, 1996
INVENTOR(S) : Reiners, et al.

It is certified that error appears in the above-indentified patent and that said Letters Patent is hereby corrected as shown below:

Col. 5, last line    Delete " processing " and substitute
                     -- process --

Signed and Sealed this

Fifteenth Day of October, 1996

Attest:

BRUCE LEHMAN

Attesting Officer    Commissioner of Patents and Trademarks